United States Patent [19]

Devereux

[11] Patent Number: 4,460,925
[45] Date of Patent: Jul. 17, 1984

[54] METHOD AND APPARATUS FOR DERIVING A PAL COLOR TELEVISION SIGNAL CORRESPONDING TO ANY DESIRED FIELD IN AN 8-FIELD PAL SEQUENCE FROM ONE STORED FIELD OR PICTURE OF A PAL SIGNAL

[75] Inventor: Victor G. Devereux, Cheam, England

[73] Assignee: British Broadcasting Corporation, London, England

[21] Appl. No.: 268,437

[22] Filed: May 29, 1981

Related U.S. Application Data

[63] Continuation of Ser. No. 43,609, May 29, 1979, abandoned.

[30] Foreign Application Priority Data

May 30, 1978 [GB] United Kingdom ............... 23926/78
Nov. 30, 1978 [GB] United Kingdom ............... 46719/78

[51] Int. Cl.³ .............................................. H04N 5/93
[52] U.S. Cl. ...................................... 358/312; 358/24; 360/10.1
[58] Field of Search .................... 358/312, 320, 13, 24; 360/10.1

[56] References Cited

U.S. PATENT DOCUMENTS

| 3,921,132 | 11/1975 | Baldwin | 360/33.1 |
| 4,051,516 | 9/1977 | Weston | 358/13 |
| 4,057,827 | 11/1977 | Hoogendijk | 358/312 |
| 4,090,218 | 5/1978 | Buul | 360/10.1 |

FOREIGN PATENT DOCUMENTS

| 1762026 | 7/1970 | United Kingdom | 358/312 |
| 1511230 | 5/1978 | United Kingdom | 358/24 |

OTHER PUBLICATIONS

"Digital Videotape Recording: An Analysis of Choices", by Diermann, vol. 87, Jun. 1978, pp. 375–378, SMPTE Journal.

Primary Examiner—Alan Faber
Attorney, Agent, or Firm—Robert F. O'Connell

[57] ABSTRACT

A single field or picture of a PAL color television signal is stored in a store and provides a signal at an input (52). The stored signal consists of $2f_{sc}$ samples taken at 45° to the U-axis. The signal is separated by a filter (56) and subtractor (58) into a high frequency or chrominance signal and a low frequency or luminance signal. The chrominance signal is delayed by delay means (62) such that the chrominance components of two lines which are an odd number of lines apart are made available simultaneously. These signals are combined by switches (S1, S2) and/or combining circuits (68) to provide a signal at $4f_{sc}$ which is combined with the luminance signal in a combining circuit (70) to provide a $4f_{sc}$ PAL output (72). The manner of the combination of the chrominance components is changed on an 8-field cycle. In an alternative arrangement, if the PAL signal is originally stored in a store which provides outputs from more than one line simultaneously, two stored lines can be combined, and the chrominance portion of the thus-combined signal combined with the luminance portion of a stored signal to provide the output.

4 Claims, 11 Drawing Figures

METHOD AND APPARATUS FOR DERIVING A PAL COLOR TELEVISION SIGNAL CORRESPONDING TO ANY DESIRED FIELD IN AN 8-FIELD PAL SEQUENCE FROM ONE STORED FIELD OR PICTURE OF A PAL SIGNAL

This is a continuation of application Ser. No. 043,609, filed May 29, 1979, now abandoned.

This invention is concerned with deriving a PAL colour television signal corresponding to any field in an 8-field PAL sequence from one stored field or picture of a PAL signal.

For a PAL signal with a colour subcarrier frequency $f_{sc}$ of 4.43 MHz, there is no particular difficulty in providing suitable luminance information in the frequency range up to about 3 MHz. The main problem is to derive the correct phase of the chrominance subcarrier relative to line and field synchronising pulses. In a conventional PAL signal, this phase relationship is repeated at intervals of 8 field periods as illustrated in Table I below.

TABLE I

Relative chrominance phases on successive lines and fields of a PAL video signal

| Line Number | | Chrominance Phase | | | | | | | |
|---|---|---|---|---|---|---|---|---|---|
| Odd Fields | Even Fields | Fields 1,9,17 | Fields 2,10,18 | Fields 3,11,19 | Fields 4,12,20 | Fields 5,13,21 | Fields 6,14,22 | Fields 7,15,23 | Fields 8,16,24 |
| N | | 0°+ | | 270°− | | 180°+ | | 90°− | |
| | N + 313 | | 90°− | | 0°+ | | 270°− | | 180°+ |
| N + 1 | | 270°− | | 180°+ | | 90°− | | 0°+ | |
| | N + 314 | | 0°+ | | 270°− | | 180°+ | | 90°− |
| N + 2 | | 180°+ | | 90°− | | 0°+ | | 270°− | |
| | N + 315 | | 270°− | | 180°+ | | 90°− | | 0°+ |
| N + 3 | | 90°− | | 0°+ | | 270°− | | 180°+ | |
| | N + 316 | | 180°+ | | 90°− | | 0°+ | | 270°− |
| N + 4 | | 0°+ | | 270°− | | 180°+ | | 90°− | |
| | N + 317 | | 90°− | | 0°+ | | 270°− | | 180°+ |

The given phases in Table I above correspond to points on a picture where the scanning lines cross a vertical line drawn down the picture, i.e. to points in a PAL video signal separated by integral multiples of precisely one line-scan period. The angles 0°, 90°, 180° and 270° indicate the relative phases of the U chrominance component; the actual values differ very slightly from these due to the picture frequency offset in the subcarrier frequency/line frequency relationship. The signs + and − indicate whether the V chrominance component is advanced or retarded by 90° with respect to the U chrominance component. It is seen that four relative phases and signs arise, namely 0°+, 270°−, 180°+ and 90°−.

One requirement for this form of processing is in equipment which provides fast, slow or stop motion pictures from a recorded PAL video signal. One known method of performing this processing for an analogue PAL signal recorded as an F.M. signal on a magnetic disc is illustrated in FIG. 1 of the drawings. FIG. 1 shows a block circuit diagram of apparatus used for "stop motion" replay with a video disc store to obtain a continuous PAL signal from a single stored field. The apparatus 10 includes an input 12 which is connected to receive the analogue frequency modulated video signal from the disc store and to which is connected a half-line delay element 14. A switch 16 selects the delayed or undelayed signal and applies it to an F.M. demodulator 18. The output of demodulator 18 is applied both to a 3.5 MHz low pass filter 20, which selects a signal representing the major part of the luminance component, and to a band-pass filter 22 centred on 4.4 MHz which selects a signal consisting predominantly of the chrominance components.

In this specification reference is made to a 625 line 50 field per second interlaced PAL signal in which $f_{sc}$ is 4.43 MHz, but these numerical values are purely for convenience in illustration, and the invention is applicable to PAL signals on other standards.

The output of the band-pass filter 22 is applied to a one-line delay 24, and a switch S1 selects the delayed or undelayed signal. This signal is then applied to an inverter 26, which has an associated switch S2 for providing the inverted or non-inverted signal. The resultant signal is applied to one input of an adder 28, the other input of which receives the output of the low pass filter 20 to provide an output 30 which is the analogue video output of the apparatus. This can then be subject to timing correction to remove any timing fluctuations.

The circuit of FIG. 1 produces a continuous 625-line PAL signal from a single stored field repeated at intervals of 312½ lines in the following manner. The ½-line delay 14 is inserted during alternate field periods so that the video signals is available at intervals of alternately 312 and 313 line-periods. As a result, the picture information from line N of a stored odd field is repeated on line N+313 of even fields. After F.M. demodulation in demodulator 18, the video signal is split into luminance and chrominance components by means of the 3.5 MHz low-pass filter 20 and 4.4 MHz band-pass filter 22. The four different chrominance phases required during an 8-field sequence for both line N and line N+313, namely 0°+, 90°−, 180°+ and 270°− in Table I, are obtained by the four different combinations of the positions of switches S1 and S2. Insertion of the inverter 26 by means of switch S2 changes the chrominance phase by 180° without affecting the ±V-axis switch, e.g. 0°+ is changed to 180°+ and 90°− is changed to 270°−. When the line delay 24 is inserted by operation of switch S1, the chrominance signal from line N is added in adder 28 to the luminance from line N+1. As a result, the phase of the U chrominance component is shifted by 90° and the V-axis switch (±) is inverted, e.g. 270°+ is changed to 0°.

Switches S1 and S2 remain in the same positions for the whole of any given field period. After the chrominance signal has been processed to have the required phase during each field period, it is added in adder 28 to the luminance signal to give a conventional PAL signal at the output.

It should be noted that the system described above and shown in FIG. 1 has the disadvantage that the chrominance information in a display of the output signal is shifted vertically with respect to the luminance information at a repetition rate of 12½ Hz when a continuous PAL signal is being derived from a single stored field.

Our British Pat. No. 1,511,230 describes a method of and apparatus for digitally sampling a PAL colour television signal with a sub-Nyquist sampling frequency equal to $2f_{sc}$. To achieve this the samples are taken at preferred phases which are one-eighth of the period of the sub-carrier (i.e. 45°) from the U-component axis of the PAL signal.

This invention is based on our appreciation that a $2f_{sc}$ sampled signal of this type lends itself to use in the derivation of the 8-field PAL cycle from a single field or picture, while enabling the disadvantage of the above-described analogue method to be overcome. At the same time the need for an output comb filter for the $2f_{sc}$ sampled signal can be avoided.

The invention is defined in the appended claims, to which reference should now be made.

The invention will be described in more detail, by way of example, with reference to the drawings, in which.

Figure 1:
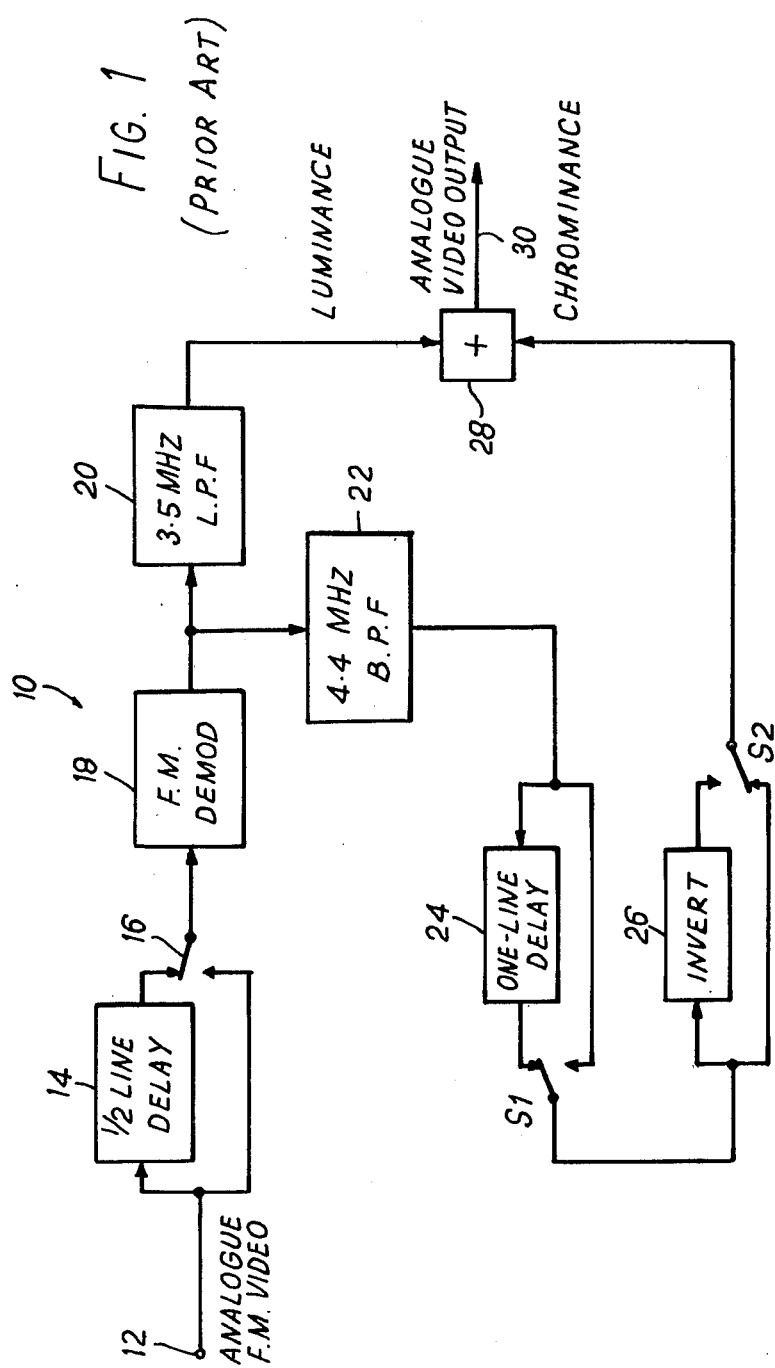
FIG. 1 (described above) is a block circuit diagram of a known system.
Figure 2:
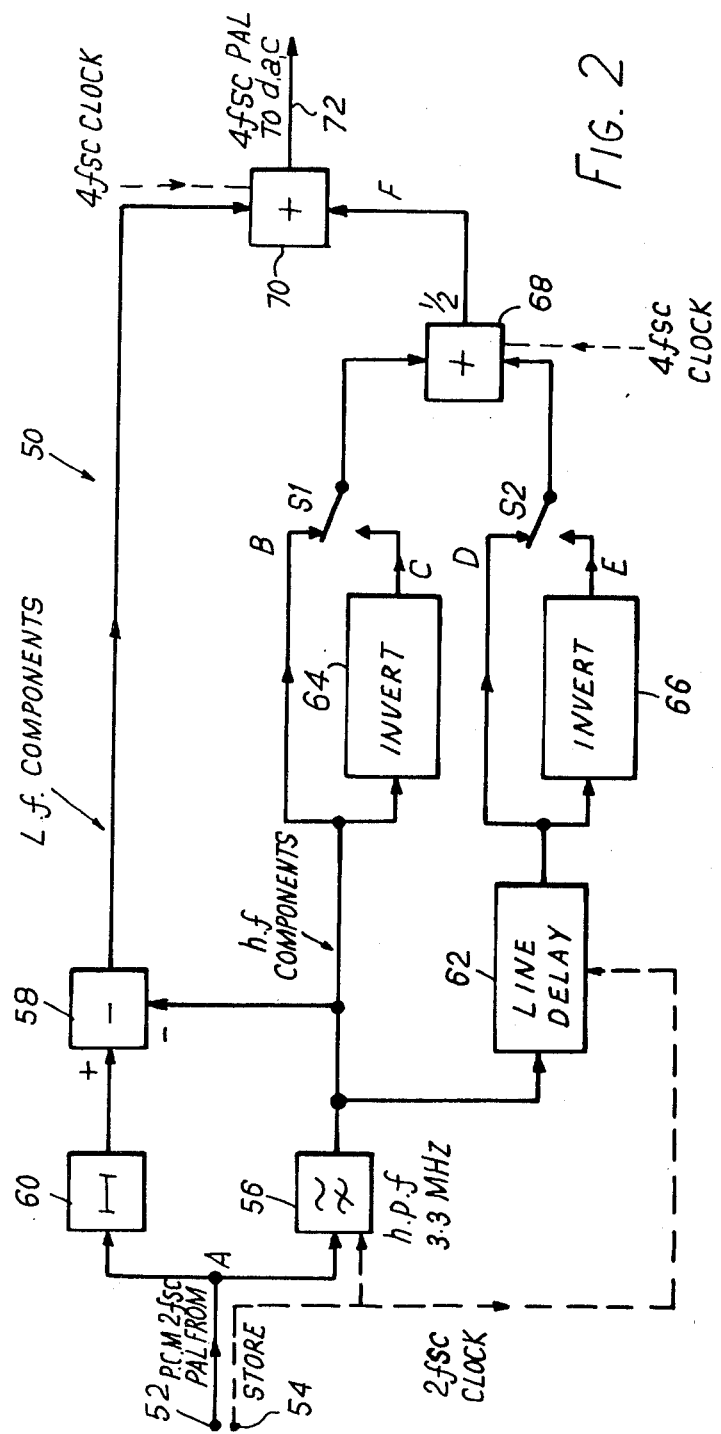
FIG. 2 is a block circuit diagram of apparatus embodying the invention for deriving a PAL signal corresponding to any field in an 8-field PAL sequence from one stored field of a PAL signal sampled at $2f_{sc}$ with the preferred sampling phases of our British Pat. No. 1,511,230.
Figure 4:
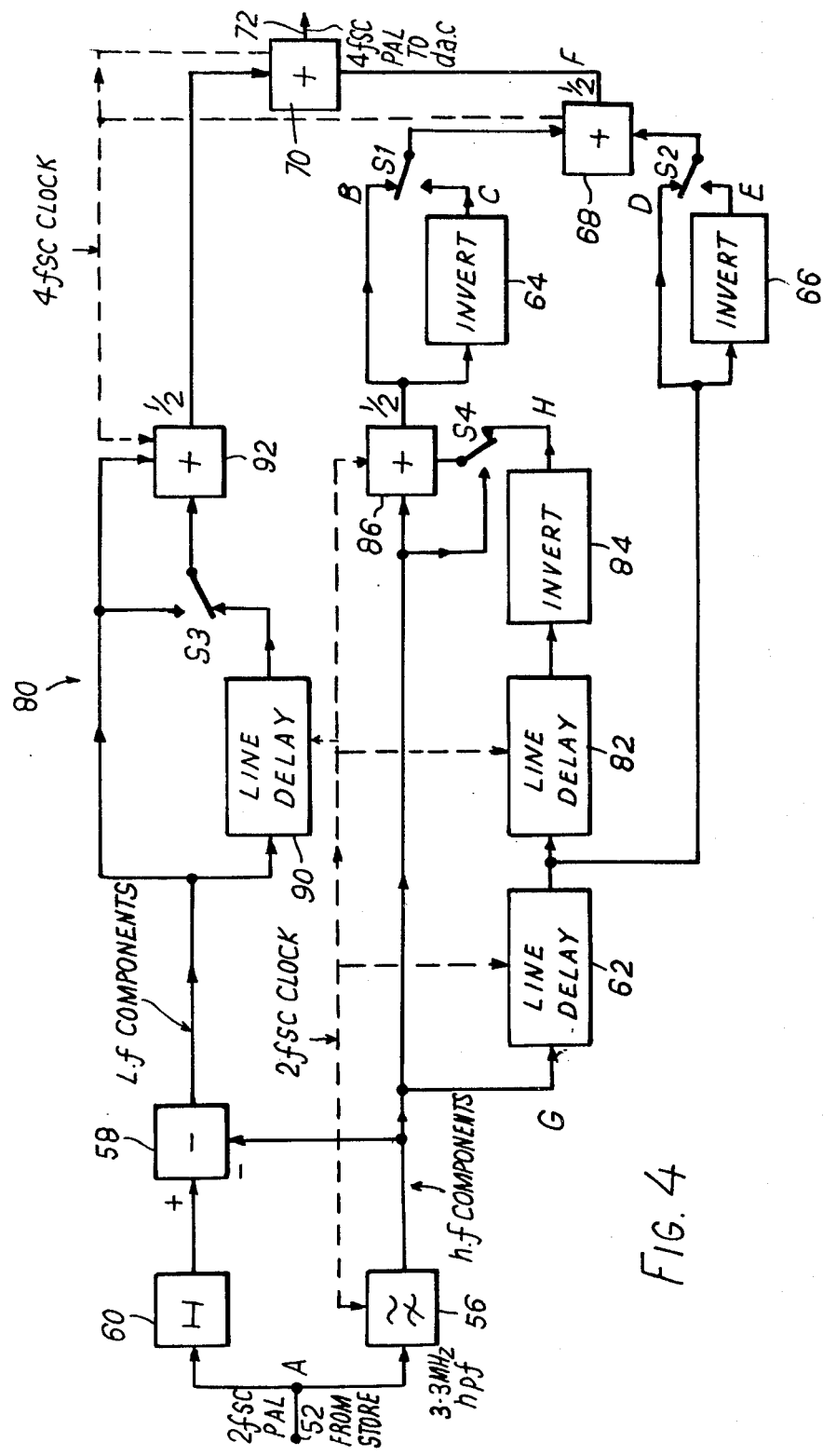
Figure 5:
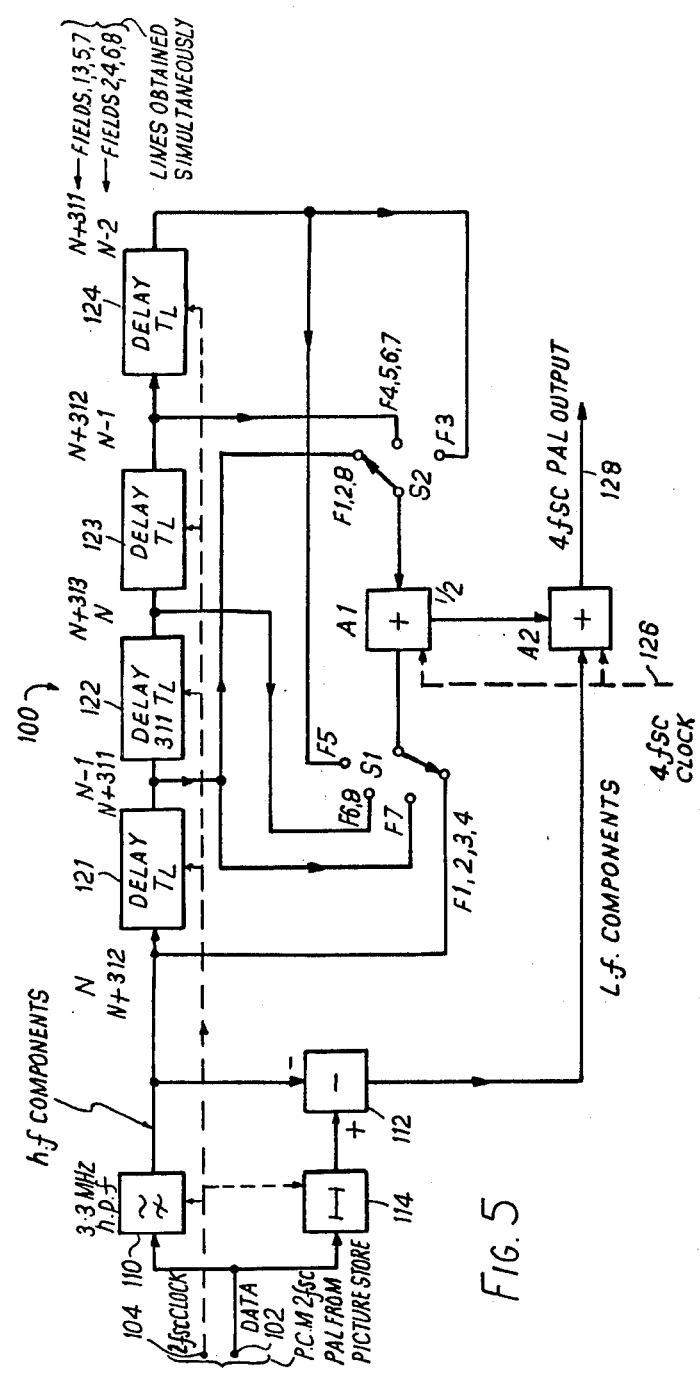
Figure 6:
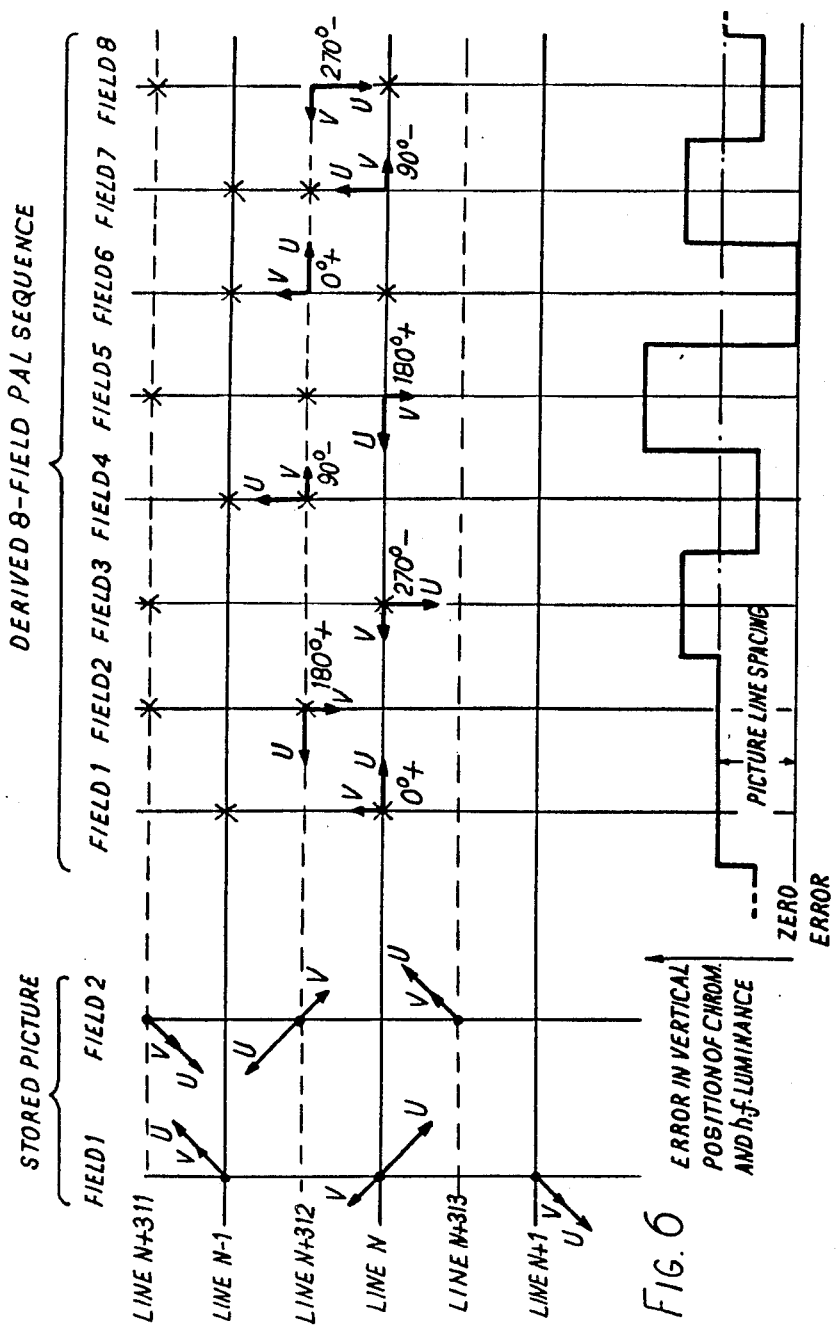
Figure 7:
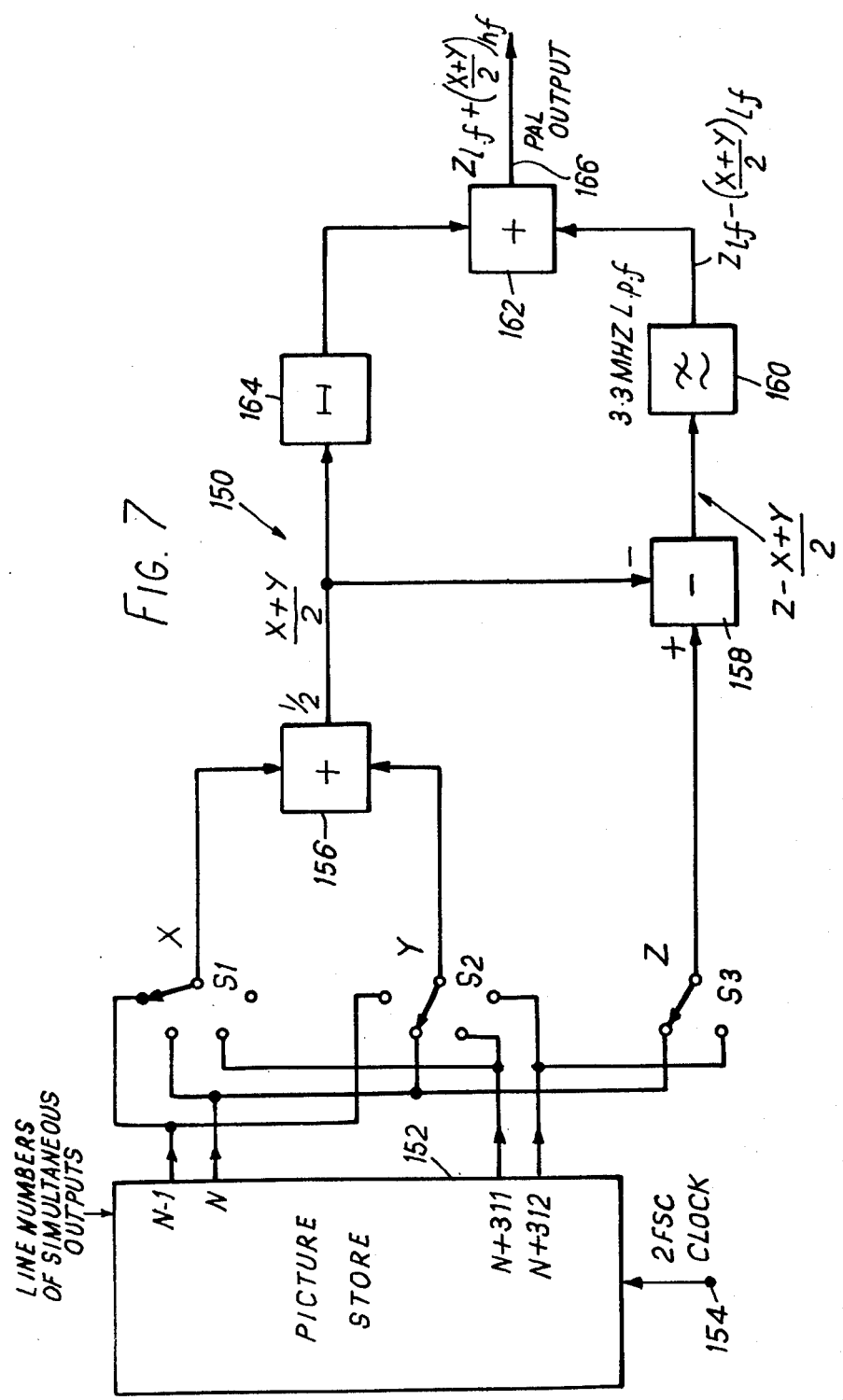

FIGS. 3A–F show relative chrominance phases for various points in the circuit of FIG. 2;

FIG. 4 is a block circuit diagram of an improved version of the apparatus of FIG. 2;

FIG. 5 is a block circuit diagram of apparatus embodying the invention for deriving a PAL signal corresponding to any field in an 8-field PAL sequence from one stored picture (two fields) of a PAL signal sampled at $2f_{sc}$ with the preferred sampling phases;

FIG. 6 is a vector diagram illustrating the effect of the apparatus of FIG. 5 on the chrominance components of the PAL signal; and FIG. 7 is a block circuit diagram of an alternative circuit to the apparatus of FIG. 5 making use of a picture store which can provide simultaneous outputs of several adjacent lines in a picture.

Reference will now be made to the embodiment of the invention shown in FIG. 2. The apparatus 50 has an input 52 connected to receive data from a suitable store (not shown) which is representative in pulse code modulated (p.c.m.) form of a PAL colour television signal, having been sampled at the sub-Nyquist frequency of $2f_{sc}$ with the preferred sampling phases of our British Pat. No. 1,511,230. At an input 54 corresponding $2f_{sc}$ clock pulses are received. The data samples are applied to a band-pass or high pass filter 56 with a lower cut-off frequency of 3.3 MHz, and from there to the inverting input of a subtractor 58. The non-inverting input of the subtractor is connected to the input 52 by a compensating delay 60 which provides a delay equivalent to that of the filter 56. In this way the signal is divided into low-frequency components emanating from subtractor 58 and high-frequency components from filter 56.

The high-frequency components are applied to a one-line delay 62, and also to an inverter 64. A second inverter 66 is connected to the output of the line delay 62. Each inverter is provided with a by-pass so that two switches S1 and S2 can select respectively the inverted or non-inverted output of the filter 56, and the inverted or non-inverted output of the line delay 62.

A circuit 68 combines the outputs of switches S1 and S2. Now, because of the line delay 62, and because in the PAL system one line period is substantially equal to an odd integral multiple of one quarter of a subcarrier period, the samples at switch S2 will be time displaced by one quarter of a subcarrier period, or one half of a $2f_{sc}$ sample period, with respect to the samples at switch S1. This will remain true for lines which are reasonably close in the picture so long as the signals at the two switches relate to lines which are an odd number of lines apart in the signal. Thus the samples at switches S1 and S2 will be interleaved, or occur alternately, and the combining circuit 68 takes the samples alternately to provide a signal at a sample rate of $4f_{sc}$. The circuit 68 effectively halves the amplitude of the signal to compensate for the fact that two sample trains are added together.

The $4f_{sc}$ high frequency samples are added to the low frequency components in an adder 70. Each low frequency sample is used in forming two $4f_{sc}$ output samples. The circuit output 72 thus constitutes a $4f_{sc}$ sampled PAL signal.

The system of FIG. 2 is thus suitable for processing p.c.m. encoded PAL signals which have been sampled at $2f_{sc}$ or $4f_{sc}$ with samples taken in the preferred phases discussed in our Pat. No. 1,511,230. Input $4f_{sc}$ signals would have to be converted to $2f_{sc}$ signals by omitting alternate samples to derive a continuous 625-line PAL signal from one stored field period of p.c.m. PAL signal, the stored field would be repeated at intervals of precisely 312 and 313 line periods alternately. The principles of operation of this circuit are as follows.

Luminance components in the frequency range from d.c. up to about 3.3 MHz are transmitted via the path marked l.f. components. Chrominance components are transmitted via the path marked h.f. components. Switches S1 and S2 are operated at intervals of one field period during the field blanking intervals. The four possible combinations of these switch positions give the four different chrominance phases which must be derived from any one input line during an 8-field PAL sequence, (see Table I). A vector diagram giving an analysis of the four different phases provided by the circuit of FIG. 2 is shown in FIG. 3.

Figure 3:
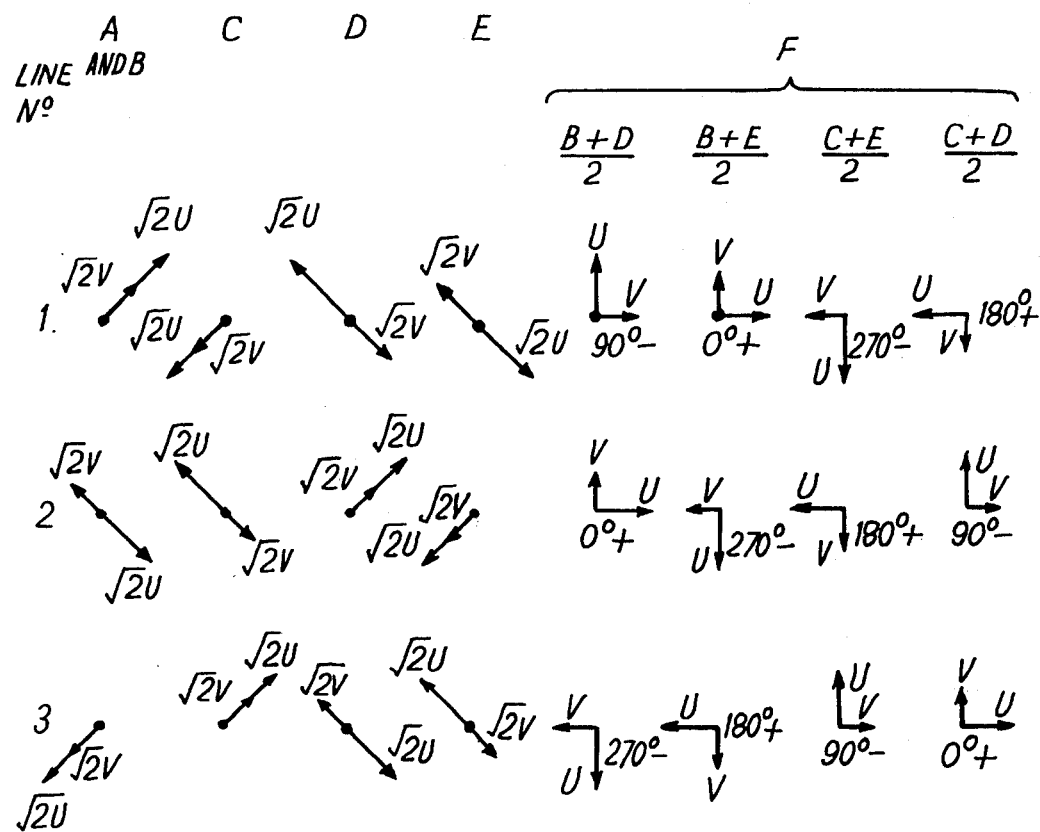

FIG. 3 shows the relative chrominance phases at the points marked A to F in the circuit of FIG. 2, the phases being given for a fixed time after the start of three successive lines of one field period, and assuming constant hue and saturation. The amplitude and phase of the vectors in the input p.c.m. $2f_{sc}$ PAL signal in the column headed "A and B" in FIG. 3 are the same as those which arise in the $2f_{sc}$ sampling of PAL signals as described in our British Pat. No. 1,511,230.

Assuming that line N+313 of an interlaced field is to have the same picture information as line N of the stored field, then the high frequency signal at point F could be derived as shown in the following Table II.

TABLE II

| | | Field No. | | | | | | |
|---|---|---|---|---|---|---|---|---|
| | | 1 | 2 | 3 | 4 | 5 | 6 | 7 | 8 |
| Signal F given by | | $\frac{B+E}{2}$ | $\frac{B+D}{2}$ | $\frac{C+E}{2}$ | $\frac{B+E}{2}$ | $\frac{C+D}{2}$ | $\frac{C+E}{2}$ | $\frac{B+D}{2}$ | $\frac{C+D}{2}$ |
| Resulting Chrominance Phases | Lines 1 and 314 | 0°+ | 90°− | 270°− | 0°+ | 180°+ | 270°− | 90°− | 180°+ |
| | Lines 2 and 315 | 270°− | 0°+ | 180°+ | 270°− | 90°− | 180°+ | 0°+ | 90°− |
| | Lines 3 and 316 | 180°+ | 270°− | 90°− | 180°+ | 0°+ | 90°− | 270°− | 0°+ |
| | Lines 4 and 317 | 90°− | 180°+ | 0°+ | 90°− | 270°− | 0°+ | 180°+ | 270°− |

Examination of the chrominance phases in the above Table II shows that they follow the same sequence as the chrominance phases in a conventional PAL signal as given in Table I.

FIG. 4 shows a more complex circuit 80 based on the circuit of FIG. 2 but in which the lines of the interlaced fields are obtained by interpolation between the lines of a stored field. Components corresponding to components in FIG. 2 are given the same reference numerals and will not be described in detail again. The circuit additionally includes a second one-line delay 82 connected to the output of the one-line delay 62 in the h.f. component part of the circuit, and having an inverter 84 connected to its output. After the chrominance signal passes through a delay of two line periods and an inverter the resulting chrominance phase is the same as that at the input to the first delay line; thus points G and H in FIG. 4 both have the same chrominance phase. A halving adder 86 is connected to the output of filter 56 and to a switch S4, which selects the output of either the filter 56 or the inverter 84. Thus in the illustrated position of switch S4 the adder 86 supplies the average of the h.f. components on the current line and the line two lines previous, whereas in its other position it supplies the h.f. components on the current line as appearing at the output of filter 56.

In the l.f. component part of the circuit a similar arrangement of a halving adder 92 and a switch S3 supplies either the average of the l.f. components on the current line and the immediately preceding line, the latter being provided by means of a one-line delay 90 connected to subtractor 58, or the l.f. components on the current line alone.

In operation of the circuit of FIG. 4, the switches S3 and S4 are in the positions shown while odd fields are being derived from an even input field, or vice versa. It should be noted that with the switches in these positions, the signals at points B, C, D and E in FIG. 4 have the same chrominance phases as the signals at the corresponding points of FIG. 2.

The opposite positions of switches S3 and S4 are used for deriving odd fields from an odd input field, and for deriving even fields from an even input field. In this instance the circuit is precisely equivalent to FIG. 2 as the additional components are not used. Thus, the chrominance phase and magnitude at points B, C, D and E in FIG. 4 are not affected by the position of switch S4 and are the same as those at the corresponding points in FIG. 3. As a result, the switching sequences required for switches S1 and S2 in FIG. 4 are the same as the switching sequences required for switches S1 and S2 in FIG. 2.

Three different methods of combining the information in different lines of a stored picture, that is to say two interlaced fields, in order to produce an 8-field PAL sequence will now be described, reference being made to FIGS. 5 to 7.

The first method is illustrated by Table III below, which shows the stored information used to derive the output signal for lines N and N+312 in successive fields of an 8-field PAL sequence. For odd fields, N will vary from 1 to 312, for even fields, from 1 to 313. K is any odd integer, and $L_N$ and $L_{N+312}$ represents the stored video information for lines N and N+312 of even and odd fields respectively.

TABLE III

| | DERIVATION OF OUTPUT SIGNAL | |
|---|---|---|
| FIELD NUMBER | LOW FREQUENCIES | HIGH FREQUENCIES Half of: |
| K, K + 8, K + 16, ... | $L_N$ | $L_{N-1} + L_N$ |
| K + 1, K + 9, ... | $L_{N+312}$ | $L_{N+311} + L_{N+312}$ |
| K + 2, K + 10, ... | $L_N$ | $L_N + L_{N+311}$ |
| K + 3, K + 11, ... | $L_{N+312}$ | $L_{N-1} + L_{N+312}$ |
| K + 4, K + 12, ... | $L_N$ | $L_{N+311} + L_{N+312}$ |
| K + 5, K + 13, ... | $L_{N+312}$ | $L_{N-1} + L_N$ |
| K + 6, K + 14, ... | $L_N$ | $L_{N-1} + L_{N+312}$ |
| K + 7, K + 15, ... | $L_{N+312}$ | $L_N + L_{N+311}$ |

A block diagram of circuitry suitable for implementing this method as defined in Table III is shown in FIG. 5. The apparatus 100 shown has a data input 102 for receiving from a suitable picture store (not shown) a PAL signal in p.c.m. form sampled at twice the colour subcarrier frequency with the sampling phases locked to the colour subcarrier at 45° and 225° to the U-component axis. Corresponding clock signals are received at an input 104. The data samples are applied through a high pass filter 110 having a cut-off frequency of 3.3 MHz to the inverting input of a subtractor 112, and through a compensating delay 114 to the non-inverting input of the subtractor. Thus the high frequency components are available at the output of the filter 110 while the low frequency components emerge from the subtractor 112.

The high frequency components are applied to a series of delay elements 121 to 124, with tapping points between each pair of delay lines. The delays are of duration approximately equal to $T_L$; 311 $T_L$; and $T_L$, respectively, where $T_L$ equals one line period, and are in practice rounded to integral multiples of one half of the $2f_{sc}$ clock period, or one quarter of a subcarrier period. The restriction gives delays which differ from precisely one and 311 line periods by about 0.5 nsec. Thus, when a line N is present at the output of the 311 line delay 122, the following set (Set A) of lines is available:

| Line: | Available at output of: |
|---|---|
| N + 312 | Filter 110 |
| N + 311 | Delay 121 |
| N | Delay 122 |
| N − 1 | Delay 123 |
| N − 2 | Delay 124 |

Alternatively, it can be considered that if line N is at the output of filter 110, the following set (Set B) of lines is available:

| Line: | Available at output of: |
|---|---|
| N | Filter 100 |
| N − 1 | Delay 121 |
| N + 313 | Delay 122 |
| N + 312 | Delay 123 |
| N + 311 | Delay 124 |

This arises because lines N−313 and N−314 can be regarded as being the same as lines N+312 and N+311 respectively.

Two switches S1 and S2 are connected to the tapping points in the manner shown in FIG. 5, and are operated at field rate so as to select different pairs of tapping points during successive fields. The selected pairs can be seen from Table III which shows the two constituent lines which are averaged to provide the high frequency component output. The connections of switches S1 and S2 during a cycle of fields F1 to F8 are shown on FIG. 5. On odd fields the above-mentioned Set A of lines is used, while on even fields Set B is employed,. As described above with reference to FIG. 2, the two selected $2f_{sc}$ signals are always in anti-phase, so that the sum of these two signals obtained from an adder A1 changes at the $4f_{sc}$ rate.

The output $4f_{sc}$ PAL signal is obtained by adding in an adder A2 one half the sum of the high-frequency components from switches S1 and S2 obtained in adder A1 to the low-frequency components from the subtractor 112.

A vector diagram illustrating the basis for this method of generating an 8-field sequence is shown in FIG. 6. This diagram shows relative chrominance phases and amplitudes at a given time after the start of adjacent picture lines, assuming the chrominance signals have been converted into analogue form.

The vectors in the left-hand pair of columns in FIG. 6 indicate the relative chrominance phases in a stored picture period of a PAL signal sampled at $2f_{sc}$, with samples taken in the preferred phases discussed in our British Pat. No. 1,511,230. These positions are spaced 45 degrees from the U axis of the PAL subcarrier signal. The vectors in the right-hand eight columns of FIG. 6 indicate the conventional 8-field PAL sequence of chrominance phases which is derived from the stored picture during the lines N of odd fields and N+312 of even fields.

The pairs of crosses marked under each output field on FIG. 6 indicate the two stored lines whose high-frequency components are added during lines N or N+312 of that field. These are the lines indicated in Table III for K=1. Inspection of FIG. 6 shows that half the sum of the chrominance vectors on the pairs of stored lines marked by crosses for any given output field, gives the output chrominance vectors shown for that field.

Using the method described above, vertical lines and edges in the picture detail will be correctly reproduced by the averaging process applied to high-frequency components. However, diagonal high-frequency detail will be attenuated by this averaging process, and this attenuation will vary from field to field because of the changes in the spacing between the lines being averaged.

A second form of picture impairment is a fixed vertical shift in high-frequency relative to low-frequency components. The amount of vertical shift is indicated at the bottom of FIG. 6 below the vectors given for the output fields. The vertical position of the derived high-frequency components has been assumed to lie midway between the lines being averaged. The most obvious effect of this shift is a slight vertical displacement of chrominance relative to luminance picture detail, varying from field to field.

The mean value of the high to low-frequency vertical shift given by the method of Table III was designed to be non-zero, in order to counteract an opposite shift normally introduced by comb-filtering prior to a $2f_{sc}$ sampling process. If desired, the mean value of the shift could be made equal to zero by employing the method illustrated in Table IV. This method requires very similar circuitry to that shown in FIG. 5 and gives identical forms of picture impairment, apart from the change in shift just mentioned.

TABLE IV

| | DERIVATION OF OUTPUT SIGNAL | |
|---|---|---|
| FIELD NUMBER | LOW FREQUENCIES | HIGH FREQUENCIES Half of: |
| K, K + 8, K + 16, ... | $L_N$ | $L_N + L_{N+1}$ |
| K + 1, K + 9, ... | $L_{N+312}$ | $L_{N-1} + L_{N+312}$ |
| K + 2, K + 10, ... | $L_N$ | $L_{N+1} + L_{N+312}$ |
| K + 3, K + 11, ... | $L_{N+312}$ | $L_{N-1} + L_N$ |
| K + 4, K + 12, ... | $L_N$ | $L_{N+312} + L_{N+313}$ |
| K + 5, K + 13, ... | $L_{N+312}$ | $L_N + L_{N+311}$ |
| K + 6, K + 14, ... | $L_N$ | $L_N + L_{N+313}$ |
| K + 7, K + 15, ... | $L_{N+312}$ | $L_{N-311} + L_{N+312}$ |

Another method is illustrated in Table V. This method is similar to the method of FIG. 2 above for deriving an 8-field sequence from one stored field, except that with a picture store there is no need to derive odd fields from even fields, or vice versa. Suitable circuitry for use with the picture store can be identical to that shown in FIG. 2.

TABLE V

| | DERIVATION OF OUTPUT SIGNAL | |
|---|---|---|
| FIELD NUMBER | LOW FREQUENCIES | HIGH FREQUENCIES Half of: |
| K, K + 8, K + 16 | $L_N$ | $L_N + L_{N-1}$ |
| K + 1, K + 9, | $L_{N+312}$ | $L_{N+312} + L_{N+311}$ |
| K + 2, K + 10, | $L_N$ | $L_N - L_{N-1}$ |
| K + 3, K + 11, | $L_{N+312}$ | $L_{N+312} - L_{N+311}$ |
| K + 4, K + 12, | $L_N$ | $-L_N - L_{N-1}$ |
| K + 5, K + 13, | $L_{N+312}$ | $-L_{N+312} - L_{N+311}$ |
| K + 6, K + 14, | $L_N$ | $-L_N + L_{N-1}$ |
| K + 7, K + 15, | $L_{N+312}$ | $-L_{N+312} + L_{N+311}$ |

One advantage of the method given in Table V is that the high/low frequency vertical shift does not vary from field to field, but remains constant at the mean value given by the method of Table III. Another advantage is that the required circuitry need include only one delay-line, this having delay $T_L$. The main disadvantage of this method is that the high-frequency components at integral multiples of line frequency (corresponding to vertical lines and edges in picture detail) are correctly reproduced in only two fields in an 8-field cycle; in the remaining six fields, they are cancelled in 4 fields and inverted in 2 fields.

An alternative simpler form of circuitry could be used for all the methods described if the picture is held in a store which can provide simultaneous outputs of several adjacent lines in a picture. A block diagram of alternative circuitry 150 suitable for the method of Table III is shown in FIG. 7. The picture store 152 in this figure gives simultaneous video outputs from lines N−1, N, N+311 and N+312 during output line N of odd fields and output line N+312 of even fields. Switches S1 and S2 select the lines required to provide high frequency components, and switch S3 selects the line required to provide low frequency components.

The outputs X and Y of switches S1 and S2 are applied to a halving adder 156, the output (X+Y)/2 of which is applied to the inverting input of a subtractor 158. The non-inverting input of the subtractor receives the output of switch S3. The subtractor output is applied to a low pass filter 160 with a 3.3 MHz cut-off frequency the ouput of which is applied to one input of an adder 162, the other input of which receives the output of adder 156 through a compensating delay 164. In this way the full bandwidth switch outputs X, Y and Z are filtered to produce the required output signal at 166. The processing of the signals from the store may be carried out by digital and/or analogue circuitry. If only one output were available from each of the two stored fields, simultaneous feeds of adjacent lines could be readily provided by the addition of one-line delays.

The different methods described above give a correct 8-field sequence of the chrominance signal in areas of constant hue and saturation, and a correct luminance signal for frequencies up to about 3 MHz (assuming $f_{sc}=4.43$ MHz), but they produce different types of relatively minor picture impairments. These impairments include:

(a) Loss of vertical resolution of chrominance detail.
(b) Loss of diagonal luminance resolution.
(c) Vertical displacement of chrominance and/or high frequency luminance picture detail relative to low frequency luminance detail.
(d) Incorrect phase and/or amplitude of high frequency luminance detail.
(e) Poor cancellation of the "alias" components resulting from sub-Nyquist sampling.

All these impairments remain constant during a given field period but may alter from field to field, causing movement judder or flickering effects at edges in picture detail.

I claim:

1. A method of deriving a PAL colour television output signal, corresponding to any one field in an 8-field PAL signal sequence, from a field or picture of said PAL signal sequence stored in a store, the stored signal comprising samples taken at twice the colour subcarrier frequency ($2f_{sc}$) at phase positions which are spaced substantially by one-eighth of the period of the subcarrier from the zero crossing points of the U-component of the chrominance component of the signal, said method comprising the steps of
providing from the stored signal samples a luminance signal and a chrominance signal;
providing from said chrominance signal at least two signals subject to a delay relative to said chrominance signal of substantially an integral number of lines such that at least the chrominance components of at least two lines which are an odd number of lines apart are available simultaneously;
simultaneously combining the chrominance component samples of said at least two lines to provide a combined chrominance signal having a sample frequency of $4f_{sc}$, said at least two lines being selected to provide a phase corresponding to said any one field; and
further combining said simultaneously combined chrominance signals with the luminance signal to form said PAL output signal.

2. Apparatus for deriving a PAL colour television output signal corresponding to any one field in an 8-field PAL signal sequence from a field or picture of said PAL signal sequence stored in a store, said apparatus comprising
first means for receiving the stored signal from said store and for making available therefrom simultaneously a luminance signal and at least two chrominance signals subject to a delay of an odd integral number of lines relative to the chrominance signal of said stored signal, and
second means for simultaneously combining said at least two chrominance signals with each other to provide a combined chrominance signal having a phase selected to correspond to said any one field and for further combining said combined chrominance signal with said luminance signal to form said PAL output signal.

3. Apparatus as in claim 2 comprising
an input terminal for receiving an input PAL signal,
separating means for separating from the input signal a high frequency signal containing the chrominance components leaving a predominantly low frequency signal containing the luminance components,
delay means for delaying the high frequency signal to provide simultaneously at least two high frequency signals each having a sample frequency of $2f_{sc}$ and subject to a relative delay of an odd integral number of lines,
selector means for providing selected combinations of said lines for different fields of the 8-field PAL signal sequence, and
simultaneous combining means for combining the two high frequency $2f_{sc}$ signals to provide a signal having a sample signal of $4f_{sc}$ and for further combining said $4f_{sc}$ signal with the low frequency signal to form said PAL output signal.

4. Apparatus for deriving a PAL colour television output signal corresponding to any one field of a PAL input signal having a sequence of fields, said apparatus comprising
a store for containing a field of said PAL input signal and for providing two or more lines of said field simultaneously,
means for selecting and simultaneously combining at least two stored signals each having a sample frequency of $2f_{sc}$ which are separated by an odd integral number of lines to provide a signal having a sample frequency of $4f_{sc}$ and
means for combining the chrominance portion of the $4f_{sc}$ signal with the luminance portion of the stored signal to provide said PAL output signal.

* * * * *